United States Patent [19]

Lang

[11] 4,239,581
[45] Dec. 16, 1980

[54] APPARATUS FOR SEALING LAP JOINTS OF FUSIBLE ROOFING SHEETS

[76] Inventor: John N. Lang, 46 Allpark Ave., Pittsburgh, Pa. 15216

[21] Appl. No.: 32,352

[22] Filed: Apr. 23, 1979

[51] Int. Cl.$^3$ .................. B32B 31/00; B32B 31/12; B29C 25/00; F23C 5/00
[52] U.S. Cl. .................. 156/497; 156/82; 156/499; 156/579; 126/271.2 A; 432/8; 432/230
[58] Field of Search ............... 156/82, 306, 320, 322, 156/497, 499, 544, 507, 576, 556, 582, 579; 126/271.1, 271.2; 432/59, 8, 225, 227, 229, 230

[56] References Cited

U.S. PATENT DOCUMENTS

| 3,097,986 | 7/1963 | Kauer | 156/497 |
| 3,785,901 | 1/1974 | Fritzinger | 151/579 |
| 4,087,309 | 5/1978 | Lang | 156/82 |

FOREIGN PATENT DOCUMENTS 481393  12/1975  U.S.S.R. .................. 156/497

Primary Examiner—John T. Goolkasian
Assistant Examiner—L. Falasco
Attorney, Agent, or Firm—Brown, Flick & Peckham

[57] ABSTRACT

A burner has a flame chamber formed by flat upper and lower walls connected by side walls and a front end wall, with a fuel inlet for connection to a fuel source and with an open rear end. A handle is connected with one side of the burner for inserting it between the overlapping layers of a lap joint of fusible roofing sheets for sliding it forward along the joint while flame issues from the rear end of the burner to fuse the overlapping layers together. A hold-down member normally is spaced above the burner, but a device is provided for lowering that member into close proximity to the burner for engaging the upper surface of the upper layer of the lap joint and holding that layer down on the burner as the burner is moved forward. The apparatus may also include a second shorter flame chamber disposed above the front portion of the other chmaber, with openings between them for flow of gas and flames from the lower chamber to the upper one.

8 Claims, 7 Drawing Figures

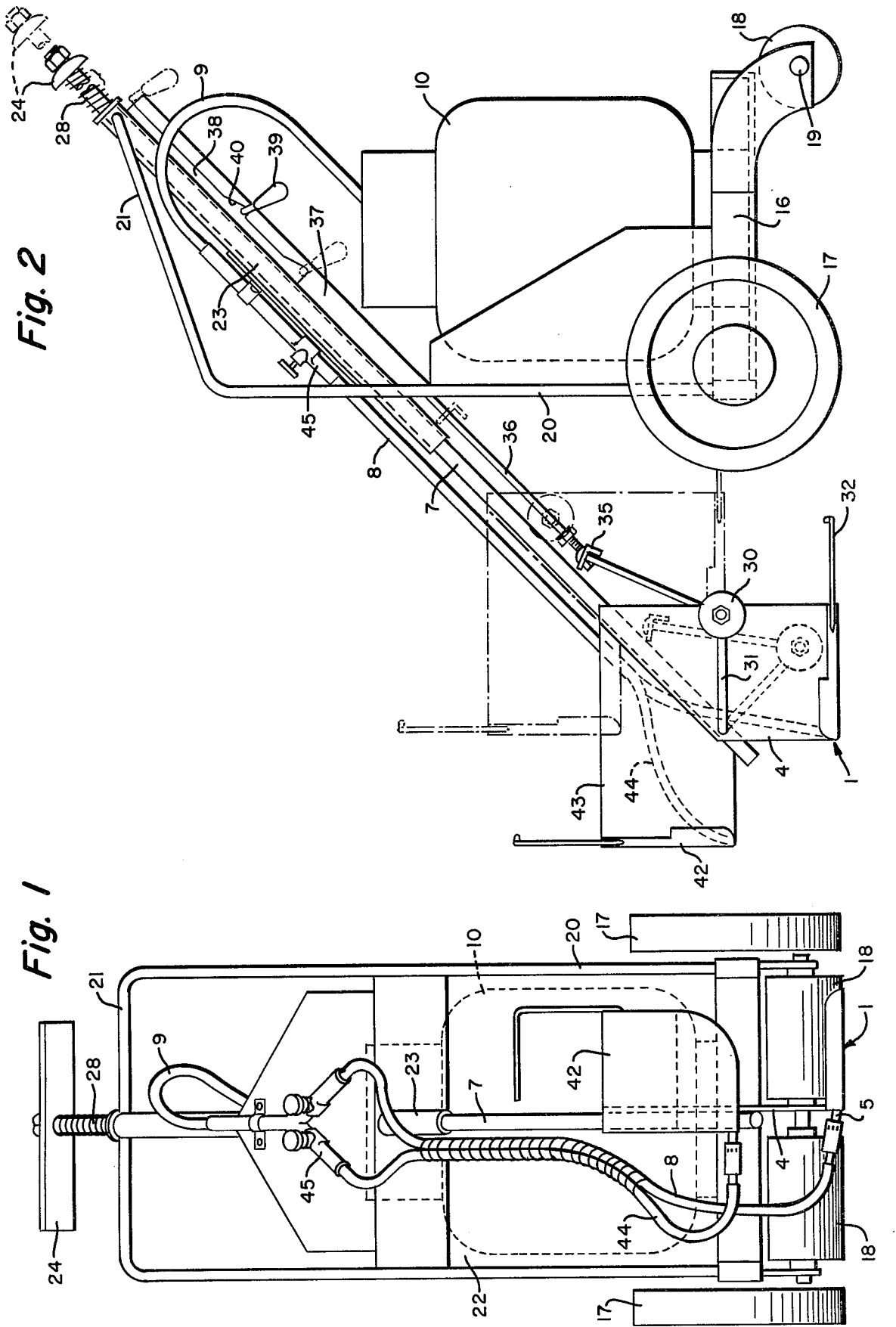

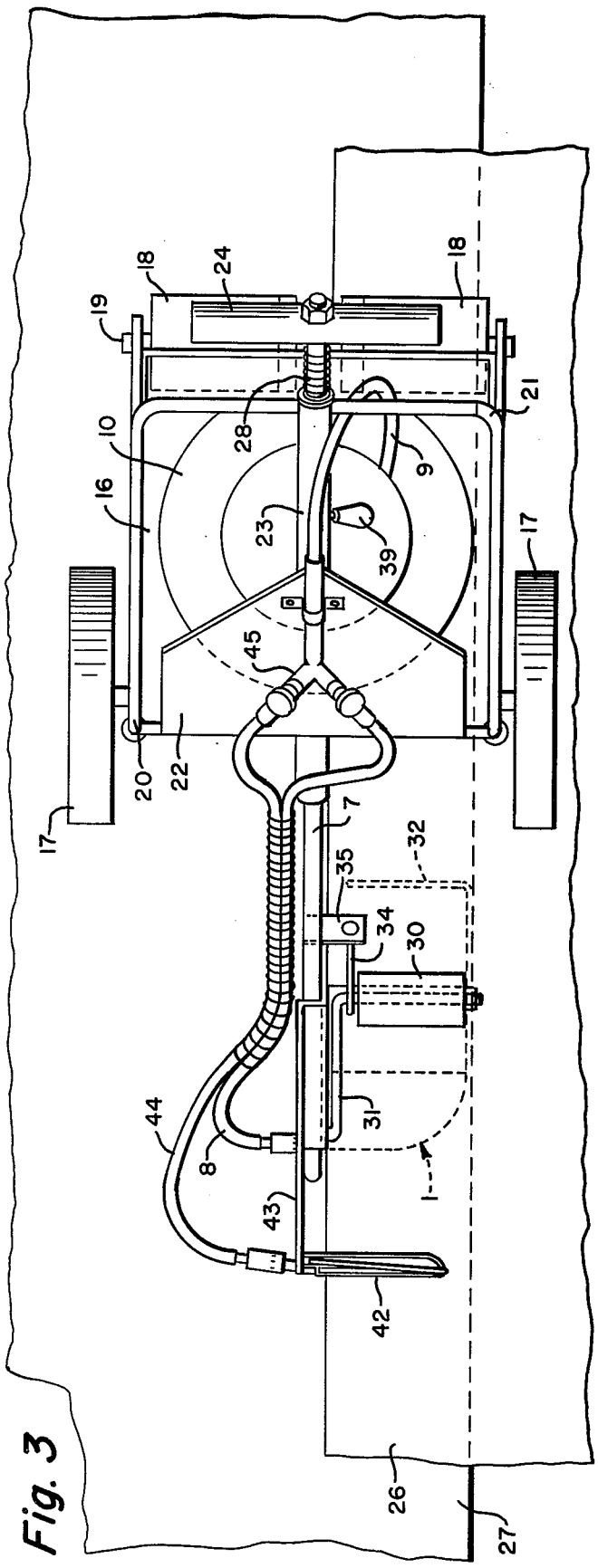
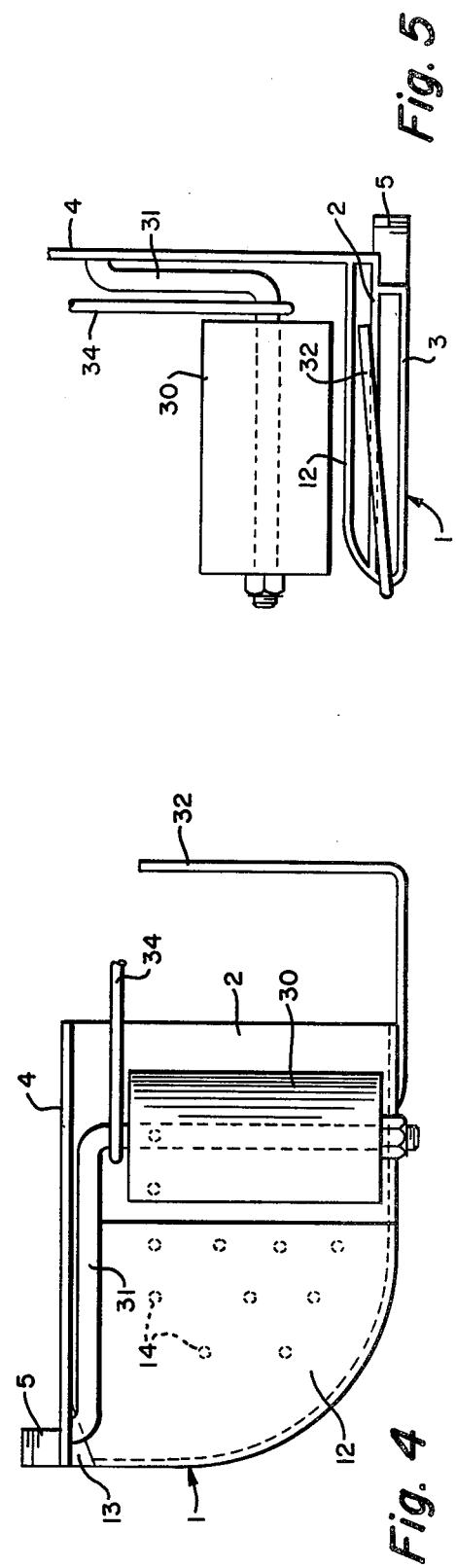

APPARATUS FOR SEALING LAP JOINTS OF FUSIBLE ROOFING SHEETS

In my U.S. Pat. No. 4,087,309, apparatus is disclosed for sealing lap joints of fusible roofing sheets. The apparatus includes a burner that is moved along a lap joint between the overlapping areas of the sheets. The burner heats the sheets, which are then pressed together to join them. In most cases the apparatus performs satisfactorily, but occasionally the upper sheet is not heated adequately or the burner flame is extinguished by wind as the burner is moved along the joint.

It is an object of this invention to improve on my patented apparatus by eliminating the chance of blowout of the burner and by improving the application of heat to the lap joint sheets.

The preferred embodiment of the invention is illustrated in the accompanying drawings, in which FIG. 1 is a front view;

FIG. 2 is a side view with a hold-down roller in its intermediate position;

FIG. 3 is a plan view;

FIG. 4 is an enlarged plan view of a burner with the hold-down roller in its lowest position;

FIG. 5 is a rear view of the burner;

Figure 6:
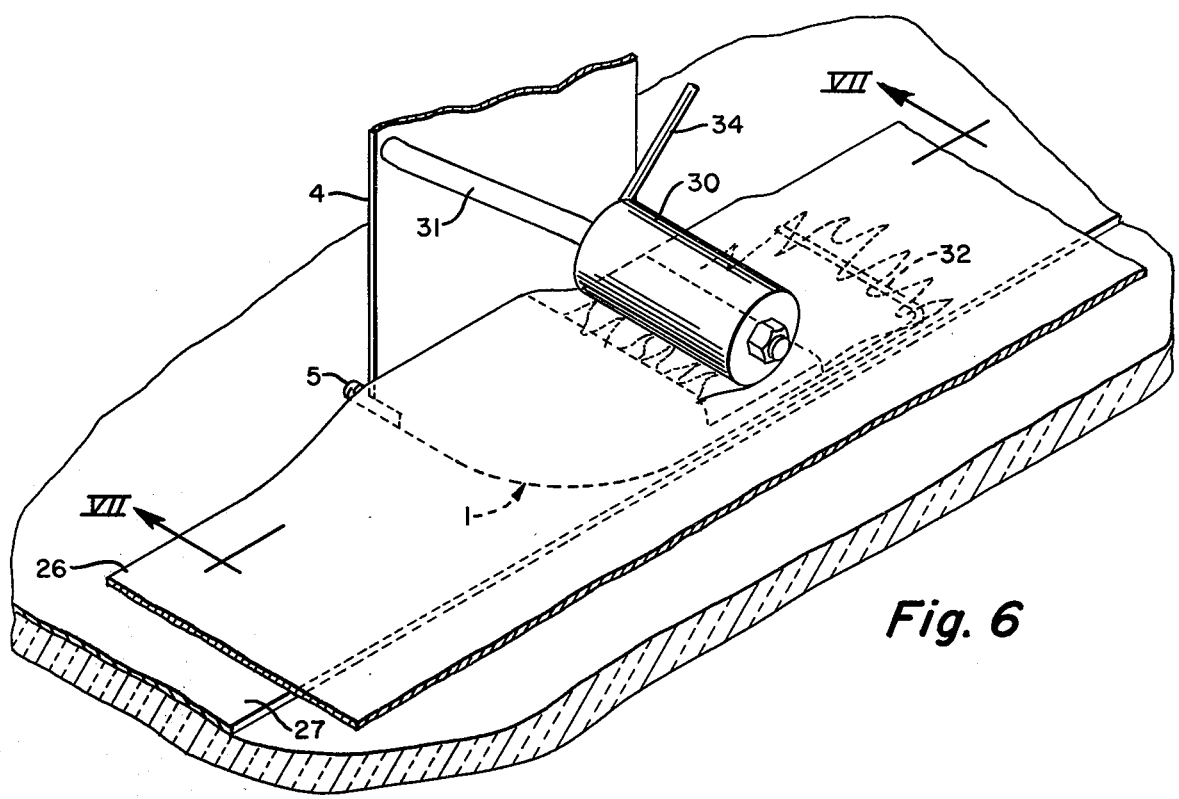
FIG. 6 is a perspective view showing the burner in operating position.

Referring to the drawings, a burner 1 is formed with substantially flat upper and lower walls 2 and 3 connected by side walls and a rounded front end wall. The rear end of the flame chamber thus formed is open. One side of the burner is joined to the lower edge of a vertical plate 4, which may be an integral extension of the upper wall of the burner. Below this plate there is a fuel inlet 5 in the side of the burner, preferably near its front end. The front corner of the burner opposite the inlet is curved to eliminate a sharp corner that might possibly damage the roofing sheets with which it is used. As shown in FIGS. 1, 2 and 3, the upper part of vertical plate 4 is connected to the lower end of a shaft 7 that serves as a support and handle for the burner. The shaft is inclined upwardly and rearwardly from the burner, preferably at about a 45° angle. The fuel inlet 5 is connected by hoses 8 and 9 to a source of fuel, such as a tank 10 of propane gas.

A feature of this invention is that disposed above the front portion of the flame chamber described above there is an upper flame chamber formed between upper wall 2 and a shorter top wall 12 as shown in FIGS. 4 and 5. The front and sides of this chamber are closed, except for an air inlet 13 above the fuel inlet, but the back of the chamber is open. The common wall 2 between the two flame chambers is provided with a number of openings 14, through which gas and flames can enter the upper chamber to heat top wall 12 and issue from the rear end of that chamber.

The burner is supported by a carriage that has a base 16 supported at its front end by a pair of wheels 17, and at its rear end by a pair of rollers 18 mounted on an axle 19. Extending upwardly from the base is a frame 20 that includes a rearwardly extending handle 21 at its upper end for pushing the carriage. A vertical shield 22 is secured to the frame in front of the base and extends back along its sides. The frame and handle also rigidly support an inclined sleeve 23, in which shaft 7 is rotatably and slidably mounted. A cross bar 24 is rigidly mounted on the upper end of the shaft.

This apparatus is used by an operator walking behind the carriage and grasping handle 21. He inserts the burner between the two layers 26 and 27 of the lap joint by sliding or swinging the free side of the burner laterally into the joint. When in place, the burner rests flat on the lower sheet as shown in FIG. 7, with cross bar 24 engaging a coil spring 28 encircling shaft 7 between it and handle 21.

As is known, each roofing sheet may include a bottom strip several feet wide, of nonflammable plastic film, a coating of a fusible waterproof composition containing asphalt and covering the strip, another strip of plastic film like the bottom strip laid on top of the composition coating, a second coating of the composition covering the second strip, and a covering strip of plastic film like the other two strips on top of the upper composition coating. The material of which the plastic strips are made is subject to being consumed by high temperatures, but does not flame up.

Figure 7:
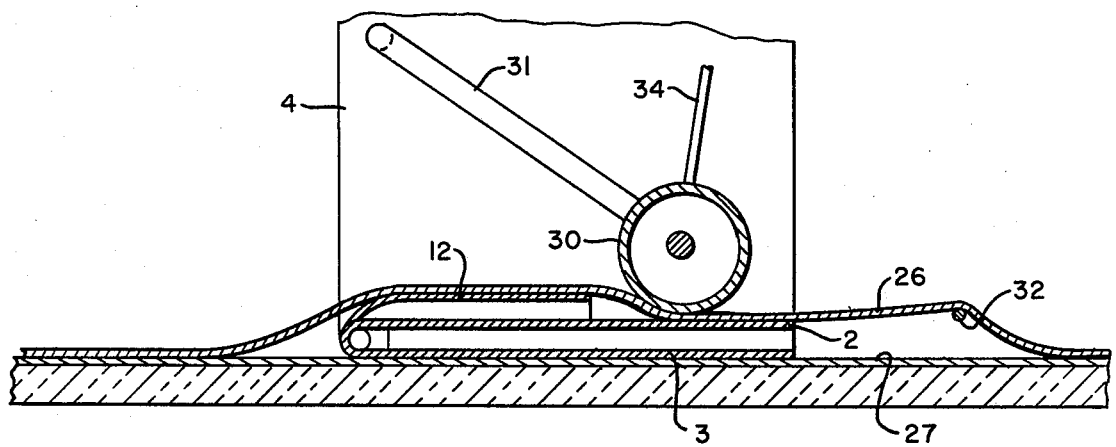
FIG. 7 is a vertical section taken on the line VII—VII of FIG. 6.

With the burner ignited and in place in a lap joint and flames issuing from the backs of the two flame chambers between the layers of the joint as shown in FIGS. 3, 6 and 7, the operator slides the burner forward along the joint from one end to the other. This movement of the burner necessarily separates the joint layers by raising the upper layer, thereby providing gaps (FIG. 7) directly behind the flame chambers before the upper layer settles back down onto the lower layer. As the burner is moved forward, the gaps progress forward with it. It is into these gaps that the burner flames issue. As the burner moves ahead, its three horizontal walls are supposed to preheat the areas of the sheets engaging them and then these preheated areas are heated to a much higher temperature by the flames in the traveling gaps.

In order for the lapped areas of the sheets to be heated properly by the burner, the top and bottom of the burner should engage them. There is no problem as far as the lower sheet is concerned because the burner rests upon it, but it is another feature of this invention that means is provided for holding the upper sheet down in engagement with the burner. Accordingly, a hold-down member is provided, preferably in the form of a relatively heavy roller 30 extending transversely of the burner. This roller is rotatably mounted on a rod 31 that is bent at right angles to extend radially of the roller and forward away from it. The front end of the rod is pivotally mounted in vertical plate 4 and shaft 7. When the roller is free, it rests by gravity on the upper sheet 26 a short distance behind the upper flame chamber and holds the sheet down on the upper wall 2 of the lower flame chamber as shown in FIG. 7. This compels the sheet in front of the roller to lie flat on top wall 12. It is desirable to extend a rod 32 rearwardly from one side of the burner and then across the burner a few inches behind it to ensure that the heated upper layer of the lap joint will not sag down over the lower chamber outlet and choke out the flame. The temperature is high enough to burn away the overlapping areas of the plastic strips that form the top and bottom of the flame-receiving gaps, and to fuse together behind the lower gap the upper composition coating in the lower layer of the joint and the lower composition coating in the upper layer. One of the rollers 18 directly behind the burners presses the two layers of the sheets securely together to form a good seal between the two fused coatings just mentioned.

With the apparatus shown in my patent, a gust of wind into the gap between the lap joint layers behind the burner would sometimes blow the flame back into the burner and extinguish it. This is avoided with the present invention because such a blowback merely forces more gas up through holes 14 into the upper flame chamber, where burning continues and immediately relights the gas in the lower chamber. The flame in the upper chamber is protected by vertical plate 4 from gusts of wind. Also, the gap behind the upper chamber is much smaller than the lower gap, which helps to keep wind from reaching the outlet of the upper chamber.

In order to lift hold-down roller 30 away from the burner so that the burner can be inserted in a lap joint, one end of a link 34 is pivotally mounted on pivoted rod 31 beside plate 4. The other end of the link is rigidly mounted in one end of a bar 35 between the roller and carriage. The opposite end of the bar is provided with a hole, in which the lower end of a long pull-rod 36 is loosely mounted. As shown in FIG. 3, this rod is located directly below the inclined shaft and extends upwardly along it and through an opening in shield 22 and on up through a channel 37 secured to the bottom of sleeve 23 above the shield. The upper end of the rod is bent at right angles and extends out through a slot 38 in one side of the channel. The projecting portion of the rod may be provided with a handle 39.

When the hold-down roller is in its lowest or operating position, rod handle 39 is at the lower end of channel slot 38 and the roller rests by gravity on a roofing sheet overlying the burner. To lift the roller, the rod handle is pulled upwardly in the channel slot to cause the pull rod to pull link 34 and raise the roller. When the roller has been raised a few inches in this manner to the full line position in FIG. 3, handle 39 is swung down into a notch 40 in the side of the channel to prevent the rod from moving downwardly.

When it is desired to move this apparatus from one location to another, without the burner sliding on the roof or floor, the pull rod handle is pulled farther upward. This first swings roller 30 to its uppermost position close to shaft 7 and then, by means of rods 31 and 36 and their connecting link 34, pulls the shaft upwardly in sleeve 23. When the bent upper end of the pull rod emerges from the upper end of the channel, handle 39 is swung around to hook the rod bend over the end of the channel to maintain the shaft in its upper position with the burner raised.

As in my above-mentioned patent, this apparatus includes two burners, one for a right-hand lap joint and one for a left-hand lap, so that after one burner has traveled the length of a given joint between the sheets, the carriage can be turned around and the other burner inserted in the next joint for a return trip. Accordingly, a second burner 42 like burner 1 is connected by a vertical plate 43 to shaft 7. This second burner is connected by a hose 44 to one branch of a Y-shape coupling 45 mounted on shield 22. Hoses 8 and 9 are connected to the other two branches. The positions of the two burners are such that when burner 1 is in operating position as shown, plate 43 will extend forward from the shaft and support burner 42 on edge several inches above the roofing sheets, with both burners extending in the same direction from their supporting plates. When the shaft is turned 180° by means of cross bar 24, burner 42 will swing around and down into operating position while the other burner will be swung up above the roofing sheets. Although the positions of the two burners relative to each other preferably are as shown, their supporting plates could be other than in parallel planes.

If, as the carriage is moved along a lap joint, the operating burner reaches a depression in the roof where the lower layer of the joint would sag away from the burner, the operator can press cross bar 24 toward handle 21 to slide shaft 7 down in the sleeve in order to lower the burner. When the cross bar is released, coil spring 28 will return the shaft to its normally operating position.

The joint sealing apparatus disclosed herein provides a relatively rapid and dependable way of effectively sealing the lap joints of fusible roofing sheets. Only one man is required for operating the apparatus.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for sealing lap joints of fusible roofing sheets, said apparatus comprising a burner provided with a flame chamber formed by substantially flat upper and lower walls connected by side walls and a front end wall, the flame chamber having a forwardly located fuel inlet and an open rear end, a conduit for connecting said inlet to a fuel source, means connected to one side of the burner for inserting it between the overlapping layers of a lap joint and for sliding it forward along the joint while flame heats said upper and lower walls and issues from the rear end of said chamber to fuse said overlapping layers together, hold-down means extending transversely of said upper wall and spaced above it when in inoperative position for receiving the upper layer of a lap joint between the hold-down means and said upper wall, and manually operable means for lowering said hold-down means into operating position directly above said upper wall and in close proximity thereto for engaging the upper surface of the upper layer of a lap joint and holding that layer down on the upper wall as the burner is moved forward.

2. Apparatus according to claim 1, in which said hold-down means include a hold-down member, an arm connected at one end to said member and extending radially away from it, means pivotally mounting the opposite end of the arm to permit said member to be swung up and down, and manually operable means for raising and lowering said one end of the arm.

3. Apparatus according to claim 2, in which said hold-down member is a roller pivotally mounted on said arm.

4. Apparatus according to claim 2, in which said manually operable means include a rod movable lengthwise toward and away from said opposite end of said arm, and a link pivotally connected at its ends to said one end of the arm and the adjacent end of said rod.

5. Apparatus according to claim 1, in which said inserting means include a substantially vertical supporting member extending upwardly above the burner from said one side of the burner, and a shaft secured rigidly to said supporting member and inclined upwardly and rearwardly therefrom to form a handle for the burner, said lowering means being movable lengthwise of said shaft to lower said hold-down means.

6. Apparatus according to claim 5, including an inclined sleeve slidably receiving said shaft with the upper end of the shaft projecting from the sleeve, means rigidly supporting the sleeve, a cross bar mounted on the upper end of the shaft, and a coil spring encircling the shaft between said cross bar and the upper end of the sleeve, the cross bar engaging the spring when said burner is in operating position, and the shaft being movable upwardly in the sleeve to lift the burner out of operating position.

7. Apparatus according to claim 5, including an inclined sleeve slidably receiving said shaft, means rigidly supporting the shaft, means for pulling said lowering means upwardly to slide said shaft upwardly in the sleeve, and means for holding said lowering means in its upper position.

8. Apparatus according to claim 1, including an upper flame chamber formed between said upper wall and a shorter top wall spaced above the front portion of the upper wall with the front and sides of the top chamber closed, the upper chamber having an air inlet adjacent said fuel inlet and an open rear end, said upper wall being provided with openings beneath said top wall connecting said chambers, and said hold-down means in its operating position being located behind said upper flame chamber.

* * * * *